US008601092B2

(12) United States Patent
Hiroki

(10) Patent No.: US 8,601,092 B2
(45) Date of Patent: Dec. 3, 2013

(54) COMMUNICATION APPARATUS AND METHOD FOR CONTROLLING THE SAME

(75) Inventor: Shigeru Hiroki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 138 days.

(21) Appl. No.: 12/819,073

(22) Filed: Jun. 18, 2010

(65) Prior Publication Data

US 2010/0325237 A1 Dec. 23, 2010

(30) Foreign Application Priority Data

Jun. 23, 2009 (JP) ................................. 2009-149061

(51) Int. Cl.
*G06F 15/16* (2006.01)

(52) U.S. Cl.
USPC ............ 709/217; 709/220; 709/229; 455/437

(58) Field of Classification Search
USPC ............ 709/217, 220, 229, 437, 70; 455/437, 455/70
See application file for complete search history.

(56) References Cited

U.S. PATENT DOCUMENTS

| 6,901,275 | B1 * | 5/2005 | Aoyagi | 455/574 |
| 2003/0195852 | A1 * | 10/2003 | Campbell et al. | 705/51 |
| 2003/0233381 | A1 * | 12/2003 | Sugimura et al. | 707/200 |
| 2008/0079995 | A1 * | 4/2008 | Tsuji et al. | 358/1.15 |

FOREIGN PATENT DOCUMENTS

JP 2006-115164 A 4/2006

OTHER PUBLICATIONS

TransferJet(TM) Overview Whitepaper TransferJet Consortium, Spring 2009,http://www.transferjet.org/tj/transferjet_whitepaper.Pdf.
Office Action issued on Mar. 12, 2013 in counterpart Japanese Application No. 2009-149061.

* cited by examiner

*Primary Examiner* — El Hadji Sall
(74) *Attorney, Agent, or Firm* — Carter, DeLuca, Farrell & Schmidt LLP

(57) ABSTRACT

An apparatus includes a discrimination unit configured to discriminate transmission and reception switching timing based on a data amount of data transmitted from the apparatus and a data amount of data transmitted from a remote apparatus, and a control unit configured to perform switching between transmission and reception according to the discriminated switching timing discriminated, so that data can be transmitted in a plurality of divided times to the communication remote apparatus or data can be received in a plurality of divided times from the remote apparatus.

9 Claims, 10 Drawing Sheets

COMMUNICATION APPARATUS AND METHOD FOR CONTROLLING THE SAME

BACKGROUND OF THE INVENTION

1. Field of the Invention

The present invention relates to a communication apparatus and a method for controlling the communication apparatus.

2. Description of the Related Art

In a wireless communication performed between two apparatuses, if a wireless resource (e.g., time or frequency) is allocated beforehand for each of transmission processing and reception processing, the wireless communication may not be performed efficiently. Therefore, for example, IEEE802.11 wireless local area network (hereinafter, wireless LAN) uses a method for acquiring a transmission right on a "first come, first served" basis in a case where no carrier is detected. This method is generally referred to as Carrier Sense Multiple Access/Collision Avoidance (CSMA/CA).

Near Field Communication (NFC) and TransferJet (registered trademark) are examples of recently available non-contact communication (close proximity wireless communication). According to this kind of non-contact communication, a communication distance is very short. Only when two communication devices are located close to each other (e.g., within 10 cm for NFC or within 3 cm for TransferJet™, a wireless link can be established (connected) for data transmission/reception to be performed between two communication devices. If two communication devices are separated far from each other, the wireless link is disconnected.

The data communication between two communication devices according to TransferJet™ is presumed to be performed in one-to-one fashion, as described in a publicly available whitepaper (see "TransferJet™ Overview Whitepaper" TransferJet Consortium, 2009), which can be obtained from a pre-designated website introducing some use cases (e.g., http://www.transferjet.org/tj/transferjet_whitepaper.pdf). This whitepaper also describes data sharing between two users, which can be realized when their devices are located close to each other.

For example, to realize the data sharing using TransferJet™, according to an example method, a user performs an operation for selecting transmission data on a user's device and then brings the user's device close to a communication partner's device to start data communication. However, according to the non-contact communication such as TransferJet™, if the distance between two devices slightly exceeds the communication area, the wireless link is immediately disconnected. Therefore, user's performing the above described operation for selecting the transmission data while maintaining the wireless link is generally difficult. However, the above described whitepaper describes nothing about how to control data transmission and reception processing in a case where two devices are brought close to each other after the transmission data selection in each device is completed.

CSMA/CA is a method similar to the wireless LAN, which is usable as a data communication control method applicable in the above described case. According to CSMA/CA, data transmission processing begins on the "first come, first served" basis. However, in this case, if one device acquires a transmission right, the other device cannot start its own data transmission before the device that acquired the transmission right completes the data transmission.

For example, if a communication partner's device is earlier in starting data transmission than the user's device, data transmission from the user's own device does not start immediately or smoothly and therefore the user may misunderstand that the data transmission was failed. As a result, the user may unnecessarily move the user's device or may repeat the operation for retransmitting the data.

Further, in a case where a message indicating completion of the data reception is displayed at timing when data reception from the communication partner's device has been completed, the user who saw the reception completion message may misunderstand that data transmission from the user's own device has been also completed and may move the user's device away from the communication partner's device.

SUMMARY OF THE INVENTION

According to an aspect of the present invention, an apparatus includes a discrimination unit configured to discriminate transmission and reception switching timing based on a first amount of data to be transmitted from the apparatus and a second amount of data to be transmitted from a remote apparatus, and a control unit configured to perform switching between transmission and reception according to the discriminated switching timing, so that data can be transmitted in a plurality of divided times to the remote apparatus or data can be received in a plurality of divided times from the remote apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
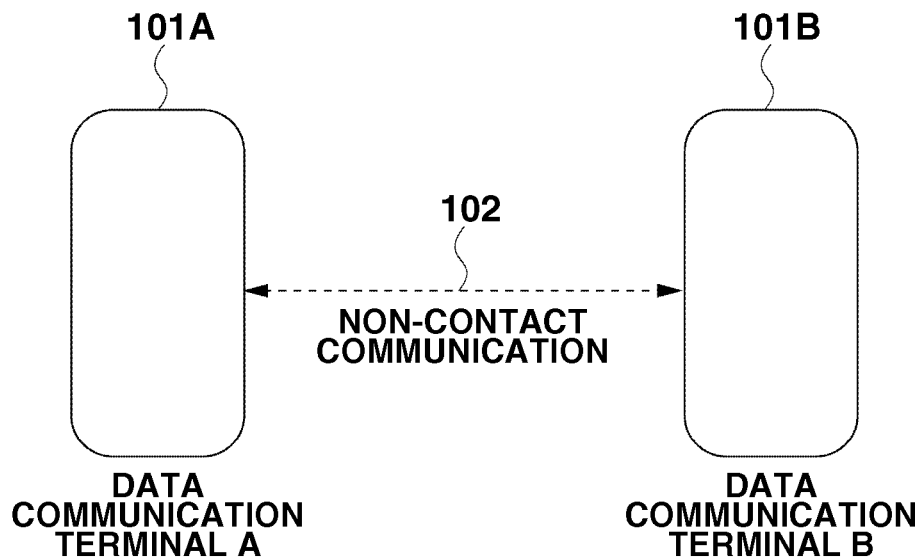
FIG. 1 illustrates an example configuration of a communication system according to an exemplary embodiment of the present invention.

FIG. 1 illustrates an example configuration of a communication system according to a first exemplary embodiment of the present invention. The communication system illustrated in FIG. 1 includes two data communication terminals (communication apparatuses) 101A and 101B. In the following description, the reference numeral 101 denotes an arbitrary data communication terminal. The data communication terminals 101A and 101B can perform data communication with each other when they are located in an area for non-contact communication (close proximity wireless communication) 102.

For example, Near Filed Communication (NFC) and TransferJet (registered trademark) are available for the non-contact communication. According to the non-contact communication, a one-to-one wireless link for data communication can be established (connected) between two data communication terminals when a distance between them becomes equal to or less than a predetermined value.

Figure 2:
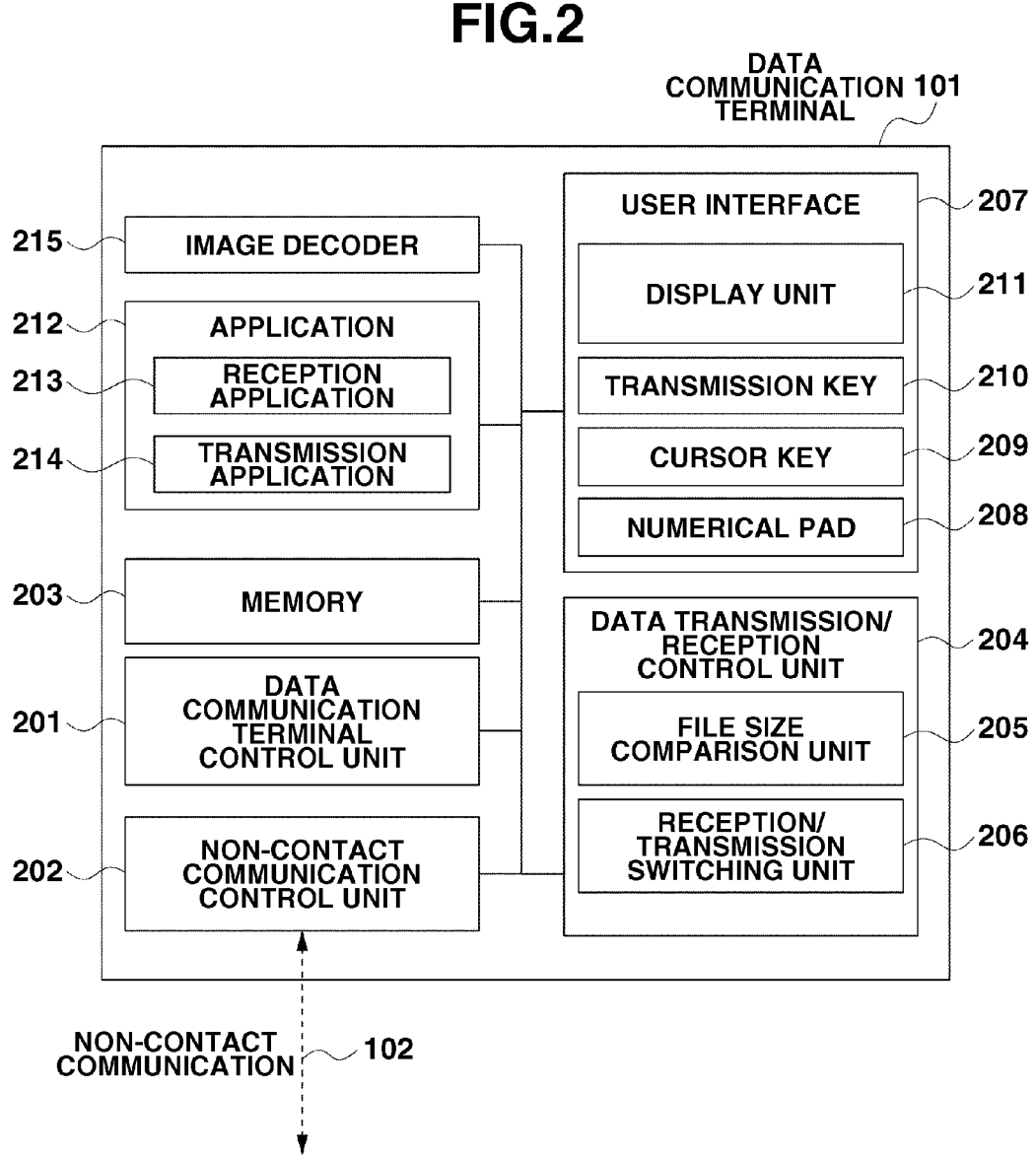
FIG. 2 is a block diagram illustrating a functional configuration of a data communication terminal according to an exemplary embodiment of the present invention.

FIG. 2 is a block diagram illustrating a functional configuration of the data communication terminal 101 according to the present exemplary embodiment. The data communication terminal 101 includes a data communication terminal control unit 201 that controls various operations that can be performed by the data communication terminal 101, a non-contact communication control unit 202 that performs link control for the non-contact communication 102 and data transmission control based on the non-contact communication 102, and a memory 203 that stores data.

The data communication terminal 101 further includes a data transmission/reception control unit 204 that controls transmission and reception of data to be performed between two communication terminals via the non-contact communication 102. The data transmission/reception control unit 204 includes a file size comparison unit 205 that compares a size of a file to be transmitted from a host data communication terminal 101 with a size of a file to be received from a partner's data communication terminal 101.

The data transmission/reception control unit 204 further includes a reception/transmission switching unit 206 that controls switching between data transmission performed by the host communication terminal 101 and data transmission performed by the partner's data communication terminal 101. The switching between transmission and reception to be performed by the reception/transmission switching unit 206 can realize "divisional transmission (or reception) of data" described below. In the present exemplary embodiment, the "divisional transmission of data" includes processes of dividing data of a transmission target into a plurality of blocks and separately transmitting each of the divided data of the transmission target.

More specifically, the reception/transmission switching unit 206 repeats processing for starting transmission of a part of a file (data) of the transmission target, then interrupting transmission processing to receive a part of a file (data) from a communication partner's apparatus, and then resuming the data transmission processing of the transmission target. For example, in a case where a transmission target file is transmitted as a plurality of divided data frames, the reception/transmission switching unit 206 can perform the "divisional data transmission (or reception)" processing by repeating the processes of "transmitting two data frames"→"receiving two data frames"→"transmitting two data frames"→ . . . .

On the other hand, even in a case where a transmission target file is transmitted as a plurality of divided data frames, the processing cannot be referred to as the "divisional data transmission" if all of the divided data frames are continuously transmitted to the communication partner's apparatus without being interrupted by reception of data from the communication partner's apparatus. In the latter case, the processing can be referred to as "batch data transmission." The "batch data transmission" includes two cases. In one case, a plurality of divided data frames are continuously transmitted as described above. In the other case, the transmission target file is directly transmitted without being divided into a plurality of data frames.

The data communication terminal 101 further includes a user interface 207. The user interface 207 includes a numerical pad 208 that can be operated to input numerical values and characters, a cursor key 209 that can be operated to instruct a movement of a cursor on a on a screen of a display unit 211, a transmission key 210 that can be operated to instruct transmission of data, and the display unit 211 that displays various screens and images. The data communication terminal 101 further includes an application group 212 which includes a reception application 213 and a transmission application 214.

The data communication terminal 101 further includes an image decoder 215 that can perform processing for decoding an image file into image data to be displayed on the display unit 211. If the reception application 213 receives image data from the partner's data communication terminal 101B, the reception application 213 successively sends the received data to the image decoder 215. The image decoder 215 decodes the received data. The display unit 211 displays an image based on the decoded data.

Figure 3:
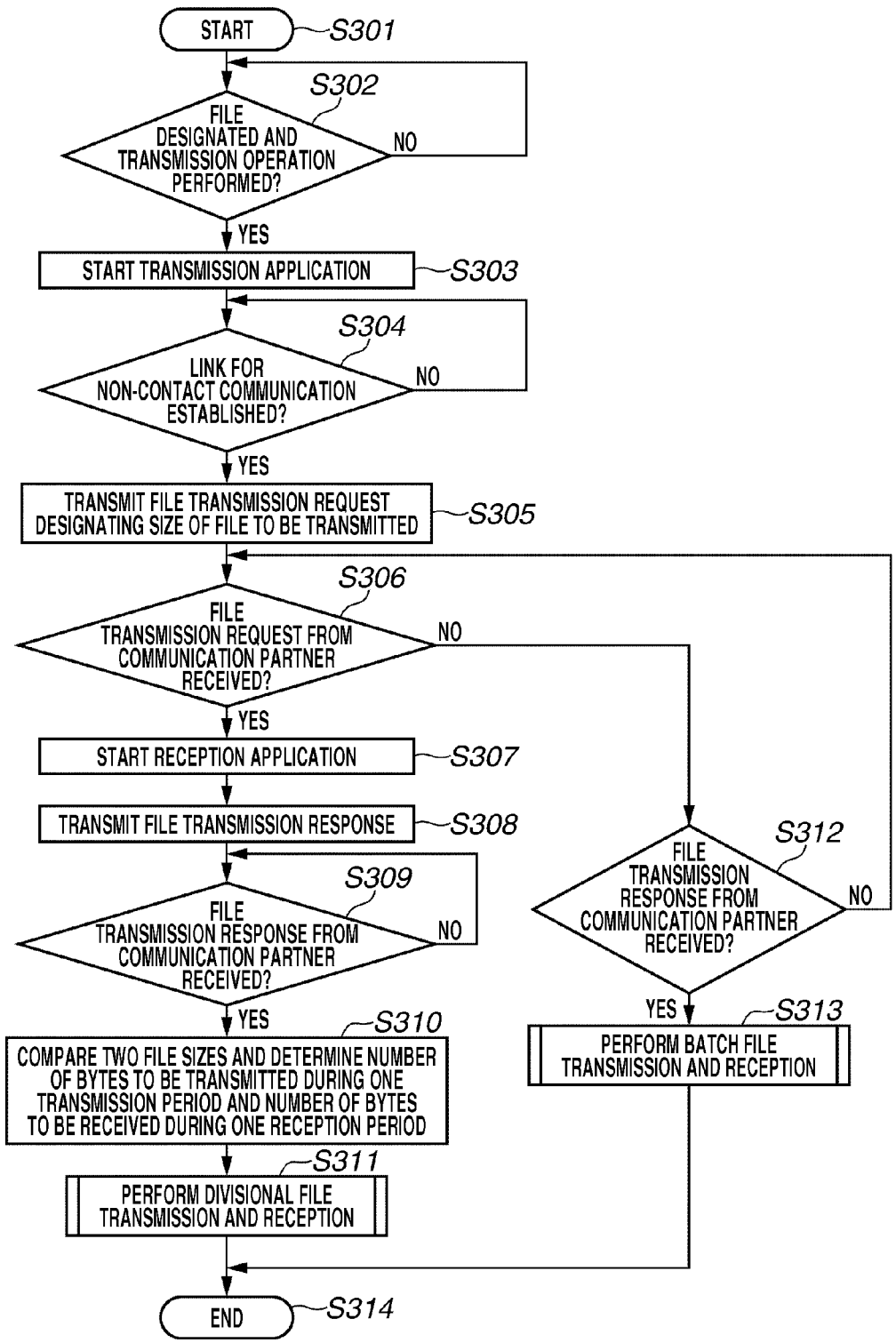
FIG. 3 is a flowchart illustrating an example operation that can be performed by a data communication terminal according to a first exemplary embodiment of the present invention.

Next, an example operation that can be performed by the data communication terminal 101 according to the present exemplary embodiment is described below. FIG. 3 is a flowchart illustrating the operation that can be performed by the data communication terminal 101 according to the present exemplary embodiment.

Figure 4:
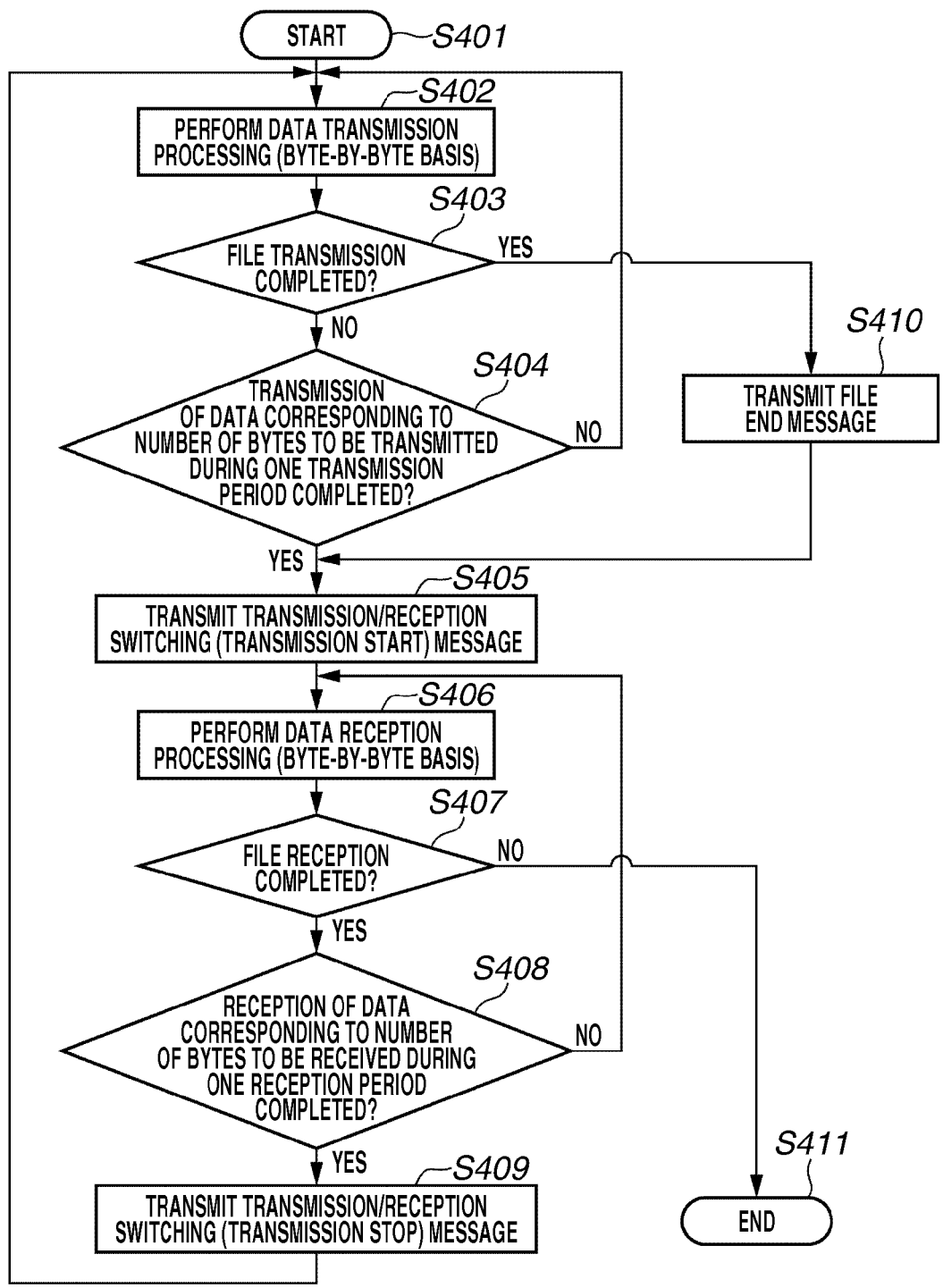
FIG. 4 is a flowchart illustrating details of divisional file transmission and reception processing according to the first exemplary embodiment of the present invention.

FIG. 4 is a flowchart illustrating details of divisional file transmission and reception processing (see step S311) illustrated in FIG. 3. The data transmission/reception control unit 204 performs the divisional file transmission and reception processing to be performed in step S311.

When a user operates a data communication terminal 101 (i.e. the host data communication terminal 101) which includes a function for performing the non-contact communication 102 to transmit a file to another data communication terminal 101, the user performs the following operation. The user manipulates the numerical pad 208 or the cursor key 209 to designate a file to be transmitted and presses the transmission key 210, while bringing an antenna portion of the host data communication terminal 101 close to an antenna portion of the other data communication terminal 101 to establish a link for the non-contact communication 102.

In step S301, the host data communication terminal 101 starts processing of the flowchart illustrated in FIG. 3. In step S302, the host data communication terminal 101 determines whether the file is designated and the above described transmission operation is performed. If it is determined that the file designation and the transmission operation have been completed (YES in step S302), then in step S303, the host data communication terminal 101 starts the transmission application 214.

When the user brings the host data communication terminal 101 closer to the other data communication terminal 101, two communication terminals 101 transmit a connection request message and receive a connection response message to establish the link for the non-contact communication 102 for transmission and reception of data.

In step S304, the host data communication terminal 101 determines whether the link for the non-contact communication 102 is established. If the link establishment for the non-contact communication 102 is confirmed (YES in step S304), then in step S305, the host data communication terminal 101 transmits a file transmission request that includes size information about the file to be transmitted to the partner's data communication terminal 101. In the present exemplary embodiment, the file transmission request is a message indicating the presence of a file to be transmitted to the partner's data communication terminal 101. Each data communication terminal 101 can refer to the content of each file transmission request transmitted from its communication partner to identify a total amount of data to be received from the communication partner.

In steps S306, the host data communication terminal 101 waits for a predetermined time for transmission of the file transmission request and determines whether the file transmission request has been received from the partner's data communication terminal 101. In step S312, the host data communication terminal 101 waits for a predetermined time for transmission of a file transmission response and determines whether the file transmission response has been received from the partner's data communication terminal 101.

If the host data communication terminal 101 has received the file transmission response without receiving any file transmission request from the partner's data communication terminal 101 (NO in step S306 and YES in step S312), then in step S313, the host data communication terminal 101 performs batch file transmission processing. In other words, in a case where no file transmission request is received, no data is transmitted from the partner's data communication terminal 101. Therefore, the host data communication terminal 101 does not interrupt the data transmission processing and completely transmits the entire data of the target file.

If the host data communication terminal 101 has received the file transmission request including the size information about a file to be transmitted from the partner's data communication terminal 101 before the host data communication terminal 101 receives a file transmission response from the partner's data communication terminal 101 (YES in step S306), the processing proceeds step S307. In step S307, the host data communication terminal 101 starts the reception application 213.

Then, in step S308, the host data communication terminal 101 transmits a file transmission response to the partner's data communication terminal 101. After completing the transmission of the file transmission response, in step S309, the host data communication terminal 101 waits for a file transmission response to be returned from the partner's data communication terminal 101.

If the host data communication terminal 101 receives the file transmission response from the partner's data communication terminal 101 (YES in step S309), then in step S310, the host data communication terminal 101 compares the size of the file to be transmitted by itself with the size of the file to be transmitted by the partner's data communication terminal 101. Further, in step S310, the host data communication terminal 101 determines the number of bytes to be transmitted at a time (during one transmission period) and the number of bytes to be received at a time (during one reception period) based on a comparison result so that two data communication terminals 101 can complete the transmission of file data substantially at the same time. In other words, the host data communication terminal 101 determines an amount of data to be transmitted before the processing is switched from transmission to reception and an amount of data to be received before the processing is switched from reception to transmission, so that both of the data communication terminals 101 perform the same number of transmission operations to complete transmission of all divided data.

For example, in a case where the size of a file to be transmitted from the host data communication terminal 101 is 46 kilobytes and the size of a file to be transmitted from the partner's data communication terminal 101 is 23 kilobytes, the host data communication terminal 101 sets a value "46 byte" as the number of bytes to be transmitted at a time and sets a value "23 byte" as the number of bytes to be received at a time. According to this example, the number of transmissions to be performed by each data communication terminal 101 is equal to 1024.

If the above described processing for determining the number of bytes to be transmitted during one transmission period and the number of bytes to be received during one reception period is completed, then in step S311, the host data communication terminal 101 starts the divisional file transmission and reception processing.

The divisional file transmission and reception processing (see step S311) is described in more detail with reference to the flowchart illustrated in FIG. 4. The data transmission/reception control unit 204 of the host data communication terminal 101 performs the divisional file transmission and reception processing to be performed in step S311, according to which switching between transmission of divided data and reception of divided data is repetitively performed.

In step S401, the host data communication terminal 101 starts the processing of the flowchart illustrated in FIG. 4. In a case where the divisional data transmission processing is performed, namely in steps S402, S403, and S404, the host data communication terminal 101 performs data transmission processing by an amount corresponding to the number of bytes to be transmitted during one transmission period which was determined in the processing of step S310.

If the host data communication terminal 101 completes file transmission by the divisional data transmission processing (YES in step S403), then in step S410, the host data communication terminal 101 transmits a file end message and terminates the divisional data transmission processing. Subsequently, the processing proceeds to step S405.

If it is determined that transmission of the data corresponding to the number of bytes to be transmitted during one transmission period is completed (YES in step S404), then in step S405, the host data communication terminal 101 transmits a transmission/reception switching (transmission start) message to the partner's data communication terminal 101.

In the present exemplary embodiment, the transmission/reception switching (transmission start) message includes information designating the number of bytes to be received during one reception period which was determined in the processing of step S310. The number of bytes to be received during one reception period which was determined in the processing of step S310 is the number of bytes to be transmitted by the partner's data communication terminal 101 during one transmission period. Accordingly, the partner's data communication terminal 101 performs transmission of data corresponding to the number of bytes designated by the transmission/reception switching (transmission start) message, and then interrupts the data transmission processing.

In a case where the divisional data reception is performed, in steps S406, S407, and S408, the host data communication terminal 101 performs data reception processing by an amount corresponding to the number of bytes to be received during one reception period which was determined in the processing of step S310.

If the data communication terminal 101 completes file reception by the divisional data reception processing (YES in step S407), namely when the data communication terminal 101 has received a data end message from the partner's data communication terminal 101, then in step S411, the data communication terminal 101 terminates the divisional file transmission and reception processing.

If it is determined that reception of the data corresponding to the number of bytes to be received during one reception period is completed (YES in step S408), then in step S409, the data communication terminal 101 transmits a transmission/reception switching (transmission stop) message to the partner's data communication terminal 101. In this case, the transmission/reception switching (transmission start) message transmitted in step S405 includes information designating the number of bytes to be transmitted during one transmission period by the partner's data communication terminal 101. Therefore, transmission of the above described message in step S409 may not be always necessary.

Figure 6:
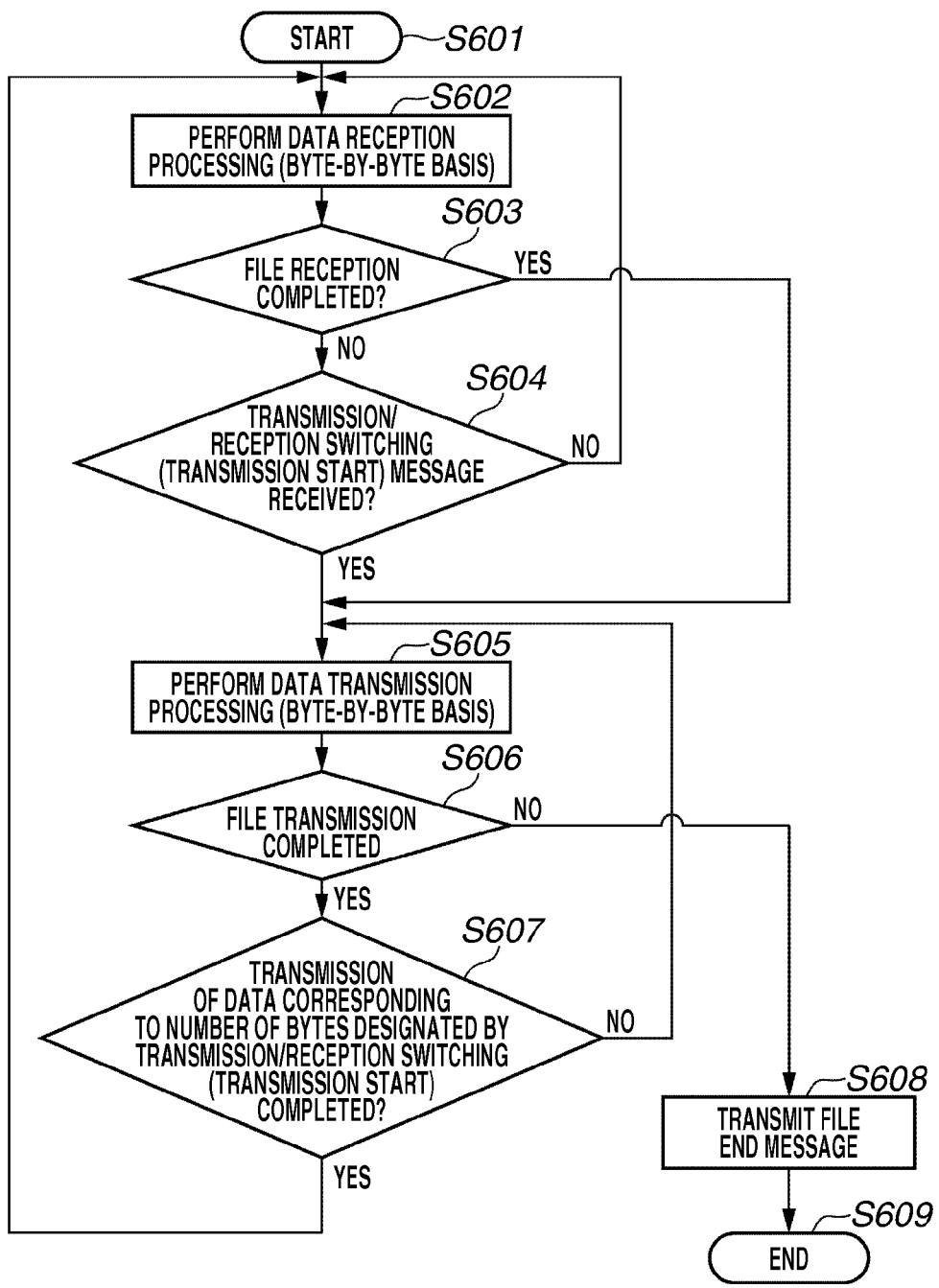
FIG. 6 is a flowchart illustrating an example operation that can be performed by a partner's data communication terminal according to the first exemplary embodiment of the present invention.

FIG. 6 is a flowchart illustrating details of the divisional file transmission and reception processing (see step S311) that can be performed by the above described partner's data communication terminal 101.

Processing that the partner's data communication terminal 101 performs before starting the divisional file transmission and reception processing (see step S311) is similar to the above described processing performed by the host data communication terminal 101. In this case, the processing in step S310 may be omitted because the number of bytes to be transmitted during one transmission period and the number of bytes to be received during one reception period are already determined by the host data communication terminal 101 based on the comparison of file sizes.

Similar to the description for the host data communication terminal 101, the data transmission/reception control unit 204 of the partner's data communication terminal 101 performs the divisional file transmission and reception processing to be performed in step S311, according to which switching between reception of divided data and transmission of divided data is repetitively performed.

In step S601, the partner's data communication terminal 101 starts the processing of the flowchart illustrated in FIG. 6. In a case where the divisional data reception is performed, namely in steps S602, S603, and S604, the partner's data communication terminal 101 performs data reception processing until a transmission/reception switching (transmission start) message is received.

If the partner's data communication terminal 101 completes file reception by the divisional data reception processing (YES in step S603), namely when the data end message is received from the host data communication terminal 101, the partner's data communication terminal 101 terminates the divisional data reception processing. Then, the processing proceeds to step S605.

If the transmission/reception switching (transmission start) message is received from the host data communication terminal 101 (YES in step S604), then in step S605, the partner's data communication terminal 101 starts divisional data transmission processing. In a case where the divisional data transmission processing is performed, namely in steps S605, S606, and S607, the partner's data communication terminal 101 performs the data transmission processing by an amount corresponding to the number of bytes designated by the transmission/reception switching (transmission start) message.

If the partner's data communication terminal 101 completes file transmission by the divisional data transmission processing (YES in step S606), then in step S608, the partner's data communication terminal 101 transmits the file end message. Then, in step S609, the partner's data communication terminal 101 terminates the divisional file transmission and reception processing illustrated in FIG. 6.

If it is determined that transmission of the data corresponding to the number of bytes designated by the transmission/reception switching (transmission start) message has been completed (YES in step S607), the processing returns to step S602 and the partner's data communication terminal 101 restarts the above described data reception processing. As another version of the present exemplary embodiment, the processing can be returned to step S602 if the transmission/reception switching (transmission stop) message is received from the host data communication terminal 101 (see step S409).

Figure 5:
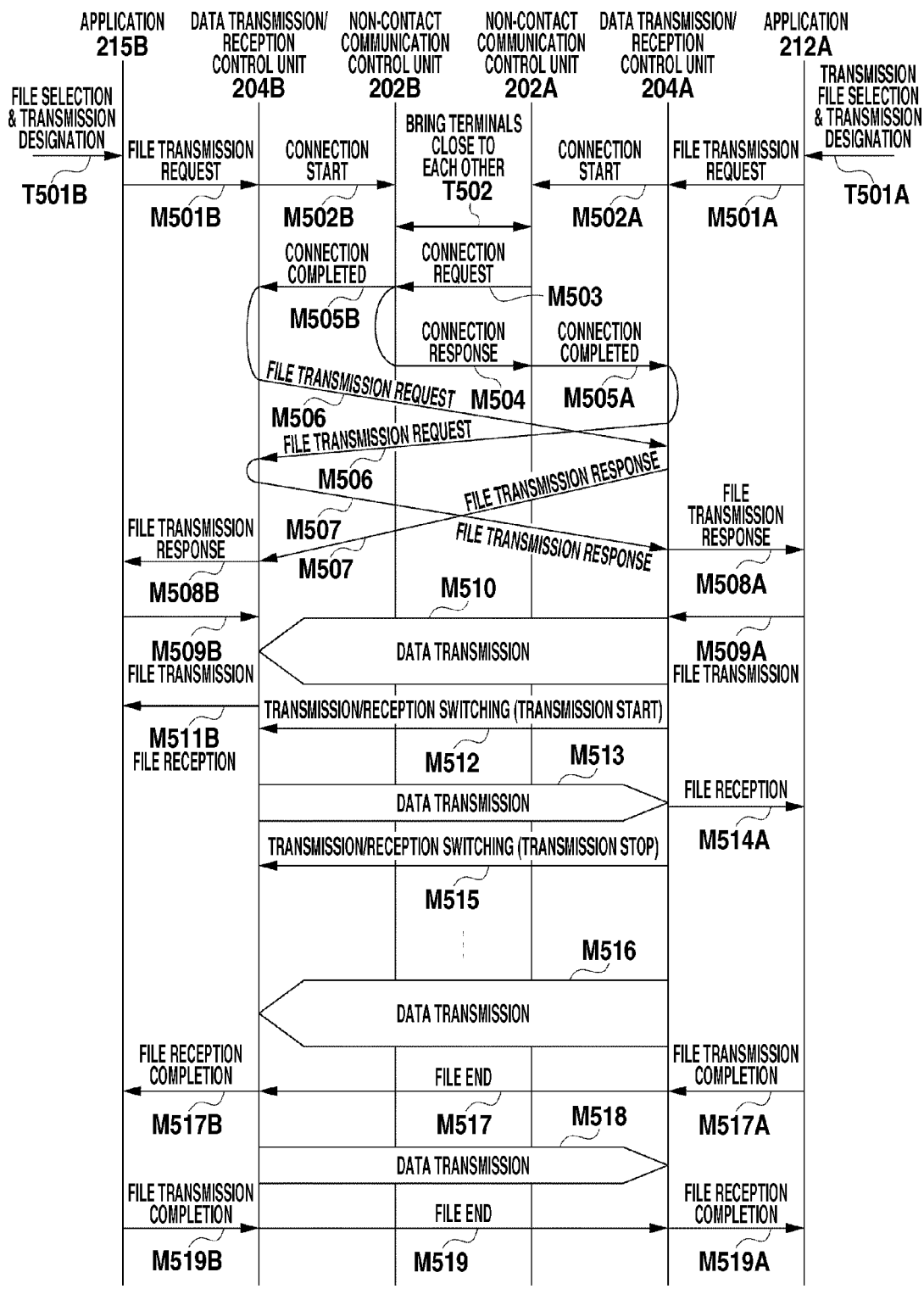
FIG. 5 illustrates an example sequence of messages transmitted and received between two data communication terminals according to the first exemplary embodiment of the present invention.

FIG. 5 illustrates an example sequence of messages transmitted and received between the data communication terminal 101A and the data communication terminal 101B according to the first exemplary embodiment of the present invention. In the example sequence illustrated in FIG. 5, the data communication terminal 101A serves as the above described "host data communication terminal" that performs the operations illustrated in FIGS. 3 and 4. The data communication terminal 101B serves as the above described "partner's data communication terminal" that performs the operation illustrated in FIGS. 3 and 6.

If in step T501A a file is designated and a transmission operation is performed by a user of the data communication terminal 101A, the transmission application is started. Next, in step M501A, application 212A sends a file transmission request to the data transmission/reception control unit 204A. Further, in step M502A, the data transmission/reception control unit 204A sends a connection start message to the non-contact communication control unit 202A.

Similarly, if in step T501B a file is designated and a transmission operation is performed by a user of the data communication terminal 101B, the transmission application is started. Then, in step M501B, the application 212B sends a file transmission request to the data transmission/reception control unit 204B. Further, in step M502B, the data transmission/reception control unit 204B sends a connection start message to the non-contact communication control unit 202B.

If in step T502 the users bring their data communication terminals 101A and 101B close to each other, then in step M503, the non-contact communication control unit 202A sends a connection request message to the non-contact communication control unit 202B. In step M504, the non-contact communication control unit 202B returns a connection response message to the non-contact communication control unit 202A. As a result, the link for the non-contact communication 102 can be established between two terminals 101A and 101B for transmission and reception of data.

In the present exemplary embodiment, each non-contact communication control unit (202A and 202B) of each data communication terminal (101A and 101B) is configured to spontaneously generate the connection request message (see step M503) in response to the connection start message sent from its data transmission/reception control unit (204A and 204B). Therefore, in FIG. 5, it is assumed that transmission of the connection request by the non-contact communication control unit 202A of the data communication terminal 101A (M503) is earlier than that by the non-contact communication control unit 202B, then in step M504, the non-contact communication control unit 202B of the data communication terminal 101B returns a connection response message to the non-contact communication control unit 202A.

When the non-contact communication control unit 202B of the data communication terminal 101B receives the connection request (see step M503), then in step M505B, the non-contact communication control unit 202B sends a connection completion message to the data transmission/reception control unit 204B. If the non-contact communication control unit 202A of the data communication terminal 101A receives the connection response message (see step M504), then in step M505A, the non-contact communication control unit 202A sends a connection completion message to the data transmission/reception control unit 204A.

If the data transmission/reception control units 204A and 204B of the data communication terminals 101A and 101B receive the connection completion message (see steps M505A and M505B), then in step M506, the data transmission/reception control units 204A and 204B transmit a file transmission request message that includes size information about a file to be transmitted, respectively. If the data transmission/reception control units 204A and 204B of the data communication terminals 101A and 101B receive the file transmission request message (see step M506), then in step M507, the data transmission/reception control units 204A and 204B return a file transmission response message.

Although not illustrated in the drawing, if the data transmission/reception control units 204A and 204B of the data communication terminals 101A and 101B receive the file transmission request message (see step M506), the data transmission/reception control units 204A and 204B transmit a reception application start instruction message to the applications 212A and 212B, respectively. Upon receiving the start instruction message, the applications 212A and 212B start the reception applications.

Further, if the data transmission/reception control units 204A and 204B of the data communication terminals 101A and 101B receive the file transmission response message (see step M507), then in steps M508A and M508B, the data transmission/reception control unit 204A and 204B send a file transmission response message to the applications 212A and 212B, respectively.

In steps M509A and M509B, in response to the file transmission response message, the applications 212A and 212B respectively instruct the data transmission/reception control units 204A and 204B to transmit a file using the currently started transmission applications. In the above described steps M509A and M509B, it is useful to cause the display unit 211 to display a message indicating that the file transmission has been started to let a user know transmission of the file.

When the file transmission instruction is received, the data transmission/reception control units 204A and 204B start divisional file transmission and reception processing. The data transmission/reception control unit 204A of the data communication terminal 101A compares the size of the file to be transmitted by itself with the size of the file to be transmitted by the partner's data communication terminal 101B. Then, the data transmission/reception control unit 204A determines the number of bytes to be transmitted during one transmission period and the number of bytes to be received during one reception period so that two data communication terminals 101A and 101B can complete the transmission of file data substantially at the same time. In other words, the data transmission/reception control unit 204A determines an amount of data to be transmitted before the processing is switched from transmission to reception.

Then, in step M510, the data transmission/reception control unit 204A of the data communication terminal 101A performs processing for transmitting the determined amount of data. When the determined amount of data transmission is completed, then in step M512, the data transmission/reception control unit 204A transmits a transmission/reception switching (transmission start) message. In the present exemplary embodiment, the transmission/reception switching (transmission start) message to be transmitted in step M512 includes information designating the amount of data to be transmitted by the data communication terminal 101B during one transmission period.

If the transmission/reception switching (transmission start) message (see step M512) is received, then in step M513, the data transmission/reception control unit 204B of the data communication terminal 101B performs processing for transmitting the designated amount of data. If data reception of the data amount designated by the data communication terminal 101B is completed, then in step M515, the data transmission/reception control unit 204A of the data communication terminal 101A transmits a transmission/reception switching (transmission stop) message. Subsequently, in steps M516 and M518, the data communication terminal 101A and the data communication terminal 101B alternately perform data transmission processing until respective terminals complete transmission of the file.

When the data transmission/reception control units 204A and 204B of the data communication terminals 101A and 101B receive data, then in steps M514A and M514B, the data transmission/reception control units 204A and 204B send a file reception notice to the applications 212A and 212B, respectively. In the above described steps M514A and M511B, it is useful to cause the display unit 211 to display a message indicating that the file reception is currently performed.

If the data communication terminal 101A completes transmission of the file, then in step M517A, the application 212A sends a file transmission completion message to the data transmission/reception control unit 204A. In step M517, the data transmission/reception control unit 204A transmits a file end message. When the data transmission/reception control unit 204B of the data communication terminal 101B receives the file end message transmitted from the data transmission/reception control unit 204A of the data communication terminal 101A (see step M517), then in step M517B, the data transmission/reception control unit 204B sends a file reception completion message to the application 212B. The data communication terminal 101B can recognize that the file reception processing has been completed based on reception of the file reception completion message (see step M517B).

Similarly, if the data communication terminal 101B completes transmission of the file, then in step M519B, the application 212B sends a file transmission completion message to the data transmission/reception control unit 204B. In step M519, the data transmission/reception control unit 204B transmits a file end message. When the data transmission/reception control unit 204A of the data communication terminal 101A receives the file end message transmitted from the data transmission/reception control unit 204B of the data communication terminal 101B (see step M519), then in step M519A, the data transmission/reception control unit 204A sends a file reception completion message to the application 212A. The data communication terminal 101A can recognize that the file reception processing has been completed based on reception of the file reception completion message (see step M519A).

When the file reception from the communication partner is completed, each of the data communication terminals 101A and 101B causes the display unit 211 to display a message indicating completion of the file reception. If the received file is an image file, the display unit 211 can display the image of the received file.

As described above, in the first exemplary embodiment, two data communication terminals exchange information indicating an amount of data to be transmitted therefrom before starting data transmission processing. Then, one data communication terminal compares the amounts of data to be transmitted by respective data communication terminals and determines switching timing of the processing to be switched alternately between transmission and reception.

More specifically, the data communication terminal determines the amount of data to be transmitted during one transmission period and the amount of data to be received during one reception period so that two data communication terminals can complete the transmission of file data substantially at the same time. Then, two data communication terminals alternately perform data transmission processing while switching transmission and reception based on the determined data amounts.

Through the above described processing, two data communication terminals can complete the data transmission processing substantially at the same timing. Further, two data communication terminals can display the message indicating completion of the reception processing substantially at the same timing. Accordingly, the above described exemplary embodiment can reduce the possibility that the reception completion message is displayed even in a state where data transmission from a user's own terminal is not completed. Therefore, even in a case where the user sees the reception completion message and immediately moves the user's terminal away from a communication partner's terminal, no significant problem arises. In this respect, the above described exemplary embodiment can improve the operability for users.

The above described method according to the first exemplary embodiment includes determining the data amount to be transmitted before switching transmission and reception for each data communication terminal so that two data communication terminals can complete data transmission processing substantially at the same time. A second exemplary embodiment provides a method for determining time for data transmission to be performed before switching transmission and reception so that two data communication terminals can complete data transmission processing substantially at the same time.

A configuration of a communication system and a functional block diagram of the data communication terminal 101 according to the second exemplary embodiment are similar to those of the first exemplary embodiment that are illustrated in FIG. 1 and FIG. 2, therefore, description thereof is not repeated.

Figure 7:
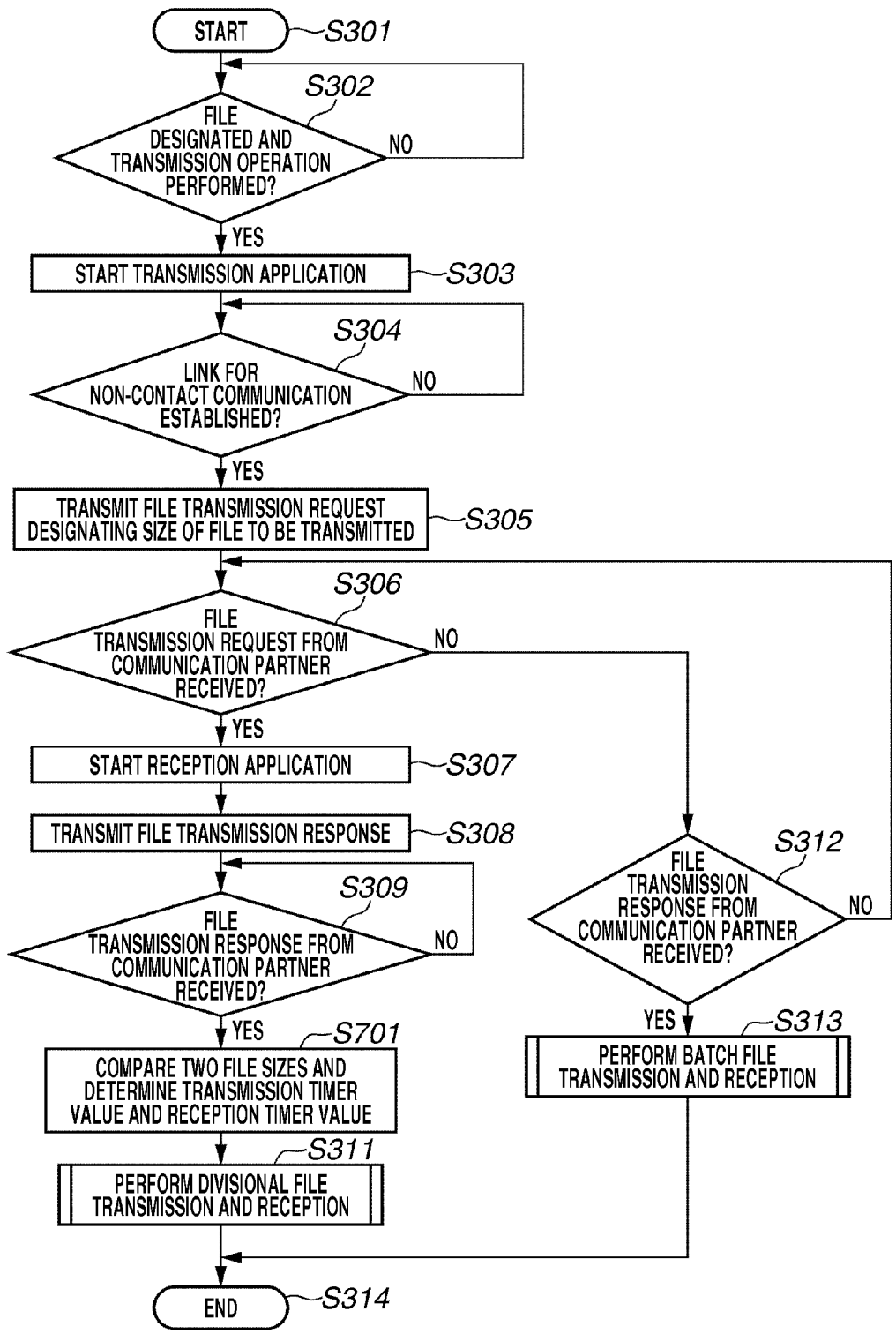
FIG. 7 is a flowchart illustrating an example operation that can be performed by a data communication terminal according to a second exemplary embodiment of the present invention.

FIG. 7 is a flowchart illustrating an operation that can be performed by the data communication terminal 101 according to the second exemplary embodiment of the present invention. In FIG. 7, steps similar to those illustrated in FIG. 3 are denoted by the same reference numerals.

Figure 8:
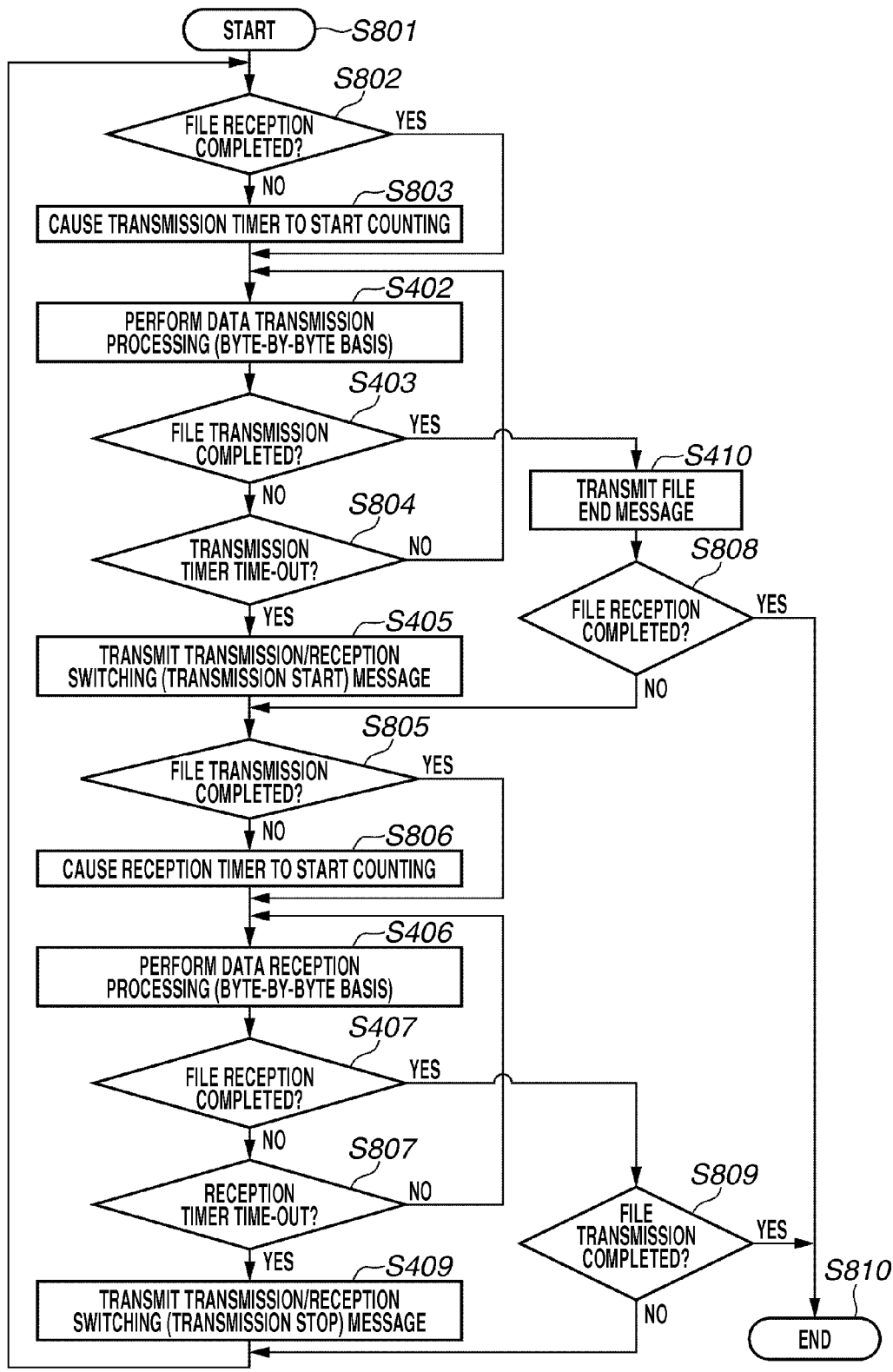
FIG. 8 is a flowchart illustrating details of divisional file transmission and reception processing according to the second exemplary embodiment of the present invention.

FIG. 8 is a flowchart illustrating details of divisional file transmission and reception processing (see step S311) illustrated in FIG. 7. The data transmission/reception control unit 204 performs the divisional file transmission and reception processing to be performed in step S311. In the flowchart illustrated in FIG. 8, steps similar to those illustrated in FIG. 4 are denoted by the same reference numerals.

In FIG. 7, the data transmission/reception control unit 204 performs processing of step S701 instead of performing the processing of step S310 illustrated in FIG. 3. In step S701, the host data communication terminal 101 compares the size of a file to be transmitted by itself with the size of a file to be transmitted by the partner's data communication terminal 101. Further, in step S701, the host data communication terminal 101 determines a transmission timer value and a reception timer value. The transmission timer value represents transmission time required for one divisional transmission in the divisional file transmission and reception processing. The reception timer value represents reception time required for one divisional reception in the divisional file transmission and reception processing.

The host data communication terminal 101 compares the size of the file to be transmitted with the size of the file to be transmitted by the partner's data communication terminal 101. Then, the host data communication terminal 101 determines the transmission timer value and the reception timer value so that two data communication terminals can complete the data transmission processing substantially at the same time. More specifically, the host data communication terminal 101 determines the transmission time and the reception time so that both of the data communication terminals 101 perform the same number of transmission operations to complete transmission of all divided data. For example, in a case where the size of a file to be transmitted from the host data communication terminal 101A is 46 kilobytes and the size of a file to be transmitted from the partner's data communication terminal 101B is 23 kilobytes, the host data communication terminal 101 sets a value "46 msec" as the transmission timer value and sets a value "23 msec" as the reception timer value. If the above described processing for determining the transmission timer value and the reception timer value is completed, then in step S311, the host data communication terminal 101 starts the divisional file transmission and reception processing.

Hereinafter, the divisional file transmission and reception processing (see step S311) is described in detail with reference to the flowchart illustrated in FIG. 8. The data transmission/reception control unit 204 performs the divisional file transmission and reception processing to be performed in step S311, according to which switching between transmission of divided data and reception of divided data is repetitively performed.

According to the first exemplary embodiment, the number of bytes to be transmitted during one transmission period and the number of bytes to be received during one reception period are determined so that the number of transmissions to be performed by one data communication terminal becomes equal to that of the other data communication terminal. Therefore, completion of the data transmission processing can be substantially equalized with completion of the data reception processing. However, the second exemplary embodiment restricts data transmission and reception by the time required for the processing. Therefore, file transmission (or file reception) by one of two terminals may complete earlier than file transmission (or file reception) by the other terminal. The divisional file transmission and reception processing according to the second exemplary embodiment takes such a situation into consideration.

In step S801, the data communication terminal 101 starts the processing of the flowchart illustrated in FIG. 8. In a case where the divisional data transmission processing is performed, in step S803, the data communication terminal 101 causes the transmission timer to start with the value determined in the processing of step S701. Then, in steps S402, S403, and S804, the data communication terminal 101 continuously performs data transmission processing until the transmission timer times out. If it is determined that the file reception has been already completed before starting the divisional data transmission processing (YES in step S802), the data communication terminal 101 does not cause the transmission timer to start. In other words, the data communication terminal 101 continuously performs the data transmission processing until the file transmission is completed without performing the divisional data reception processing.

If it is determined that the file transmission has been completed before the transmission timer times out (YES in step S403), then in step S410, the data communication terminal 101 transmits a file end message and terminates the divisional data transmission processing. In this case, if file reception from the partner's data communication terminal 101 is also completed (YES in step S808), then in step S810, the data communication terminal 101 terminates the divisional file transmission and reception processing.

If the transmission timer times out (YES in step S804), then in step S405, the data communication terminal 101 transmits a transmission/reception switching (transmission start) message to the partner's data communication terminal 101. In the present exemplary embodiment, the transmission/reception switching (transmission start) message includes information designating the reception timer value which was determined in the processing of step S701. The reception timer value determined in the processing of step S701 represents the time required for the partner's data communication terminal 101 to perform one transmission operation. Accordingly, the partner's data communication terminal 101 performs transmission of data during a period of time corresponding to the reception timer value, and then interrupts the data transmission processing. If the file transmission is completed, the data communication terminal 101 transmits a file transmission end message (see step S410), instead of transmitting the transmission/reception switching (transmission start) message. Therefore, the partner's data communication terminal 101 continuously performs the data transmission processing until the file transmission is completed.

In a case where the divisional data reception is performed, in step S806, the data communication terminal 101 causes the reception timer to start with the value determined in the processing of step S701. Then, in steps S406, S407, and S807, the data communication terminal 101 continuously performs data reception processing until the reception timer times out. If it is determined that the file transmission has been already completed before starting the divisional data reception processing (YES in step S805), the data communication terminal 101 does not cause the transmission timer to start. In other words, the data communication terminal 101 continuously performs the data reception processing until the file reception is completed without performing the divisional data transmission processing.

If it is determined that the file reception has been completed before the reception timer times out (YES in step S407), the data communication terminal 101 terminates the divisional data reception processing. In this case, if it is determined that file transmission to the partner's data communication terminal 101 is also completed (YES in step S809), then in step S810, the data communication terminal 101 terminates the divisional file transmission and reception processing.

If the reception timer times out (YES in step S807), then in step S409, the data communication terminal 101 transmits a transmission/reception switching (transmission stop) message to the partner's data communication terminal 101. In this case, the transmission/reception switching (transmission start) message transmitted in step S405 includes time information designating transmission processing to be performed by the partner's data communication terminal 101. Therefore, transmission of the above described message in step S409 may not be always necessary.

Figure 9:
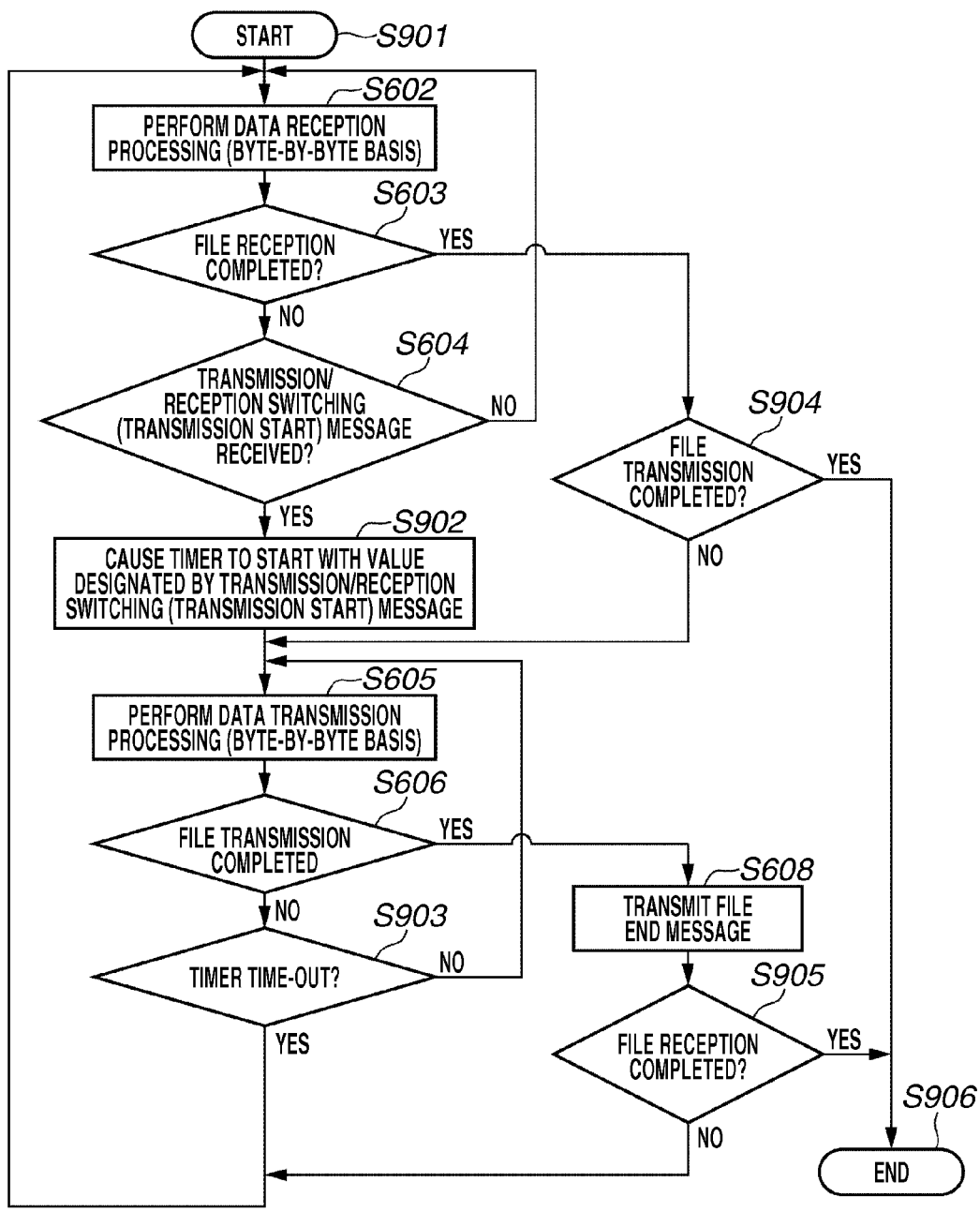
FIG. 9 is a flowchart illustrating an example operation that can be performed by a partner's data communication terminal according to the second exemplary embodiment of the present invention.

FIG. 9 is a flowchart illustrating details of the above described divisional file transmission and reception processing (see step S311) that can be performed by the partner's data communication terminal 101. In the flowchart illustrated in FIG. 9, steps similar to those illustrated in FIG. 6 are denoted by the same reference numerals. Processing that the partner's data communication terminal 101 performs before starting the divisional file transmission and reception processing (see step S311) is similar to the above described processing performed by the host data communication terminal 101. As the host data communication terminal 101 performs the processing for determining the transmission timer value and the reception timer value based on the file size comparison (see step S701), the partner's data communication terminal 101 needs not to perform similar processing.

Similar to the description for the host data communication terminal 101, the data transmission/reception control unit 204 of the partner's data communication terminal 101 performs the divisional file transmission and reception processing to be performed in step S311, according to which switching between reception of divided data and transmission of divided data is repetitively performed.

In step S901, the partner's data communication terminal 101 starts the processing of the flowchart illustrated in FIG. 9. In a case where the divisional data reception processing is performed, namely in steps S602, S603, and S604, the partner's data communication terminal 101 performs data reception processing until a transmission/reception switching (transmission start) message is received. If the partner's data communication terminal 101 completes file reception by the divisional data reception processing (YES in step S603), namely when the data end message is received from the host data communication terminal 101, the partner's data communication terminal 101 terminates the divisional data reception processing. In this case, if it is determined that file transmission to the host data communication terminal 101 is also completed (YES in step S904), then in step S906, the partner's data communication terminal 101 terminates the divisional file transmission and reception processing.

If the partner's data communication terminal 101 receives the transmission/reception switching (transmission start) message, the partner's data communication terminal 101 starts the divisional data transmission processing. In a case where the divisional data transmission processing is performed, in step S902, the partner's data communication terminal 101 causes the timer to start with the value designated by the transmission/reception switching (transmission start) message. Then, in steps S605, S606, and S903, the partner's data communication terminal 101 continuously performs data transmission processing until the timer times out. If it is determined that the file reception has been already completed before starting the divisional data transmission processing (YES in step S603), the partner's data communication terminal 101 does not cause the timer to start. In other words, the partner's data communication terminal 101 continuously performs the data transmission processing until the file transmission is completed without performing the divisional data reception processing.

If it is determined that the file transmission has been completed before the transmission timer times out (YES in step S606), then in step S608, the partner's data communication terminal 101 transmits a file end message and terminates the divisional data transmission processing. In this case, if file reception is also completed (YES in step S905), then in step S906, the partner's data communication terminal 101 terminates the divisional file transmission and reception processing illustrated in FIG. 9.

In the above described second exemplary embodiment, the host data communication terminal 101 starts the reception timer to perform the divisional data reception processing. However, the partner's data communication terminal 101 also starts the transmission timer to perform data transmission processing. Therefore, the processing of the reception timer may not be always necessary. In this case, the host data communication terminal cannot identify the timing when the processing is switched from reception to transmission. Therefore, it is necessary to perform processing for transmitting the transmission/reception switching (transmission stop) message to the host data communication terminal 101 in response to the time-out of the transmission timer of the partner's data communication terminal 101. Then, if the host data communication terminal 101 receives the transmission/reception switching (transmission stop) message, the host data communication terminal 101 switches the processing from the reception of divisional data to the transmission of divisional data.

As described above, in the second exemplary embodiment, two data communication terminals exchange information indicating an amount of data to be transmitted therefrom before starting data transmission processing. Then, one data communication terminal compares the amounts of data to be transmitted by respective data communication terminals and determines switching timing of the processing to be switched alternately between transmission and reception.

More specifically, the data communication terminal determines the time required for one divisional transmission processing and the time required for one divisional reception processing so that two data communication terminals can complete the transmission of file data substantially at the same time. Then, two data communication terminals alternately perform data transmission processing while switching transmission and reception based on the determined times.

Through the above described processing, similar to the first exemplary embodiment, two data communication terminals can complete the data transmission processing substantially at the same timing. Further, two data communication terminals can display the message indicating completion of the reception processing substantially at the same timing. Accordingly, the above described exemplary embodiment can reduce the possibility that the reception completion message is displayed even in a state where data transmission from a user's own terminal is not completed. Therefore, even in a case where the user sees the reception completion message and immediately moves the user's terminal away from a communication partner's terminal, no significant problem arises. In this respect, the above described exemplary embodiment can improve the operability for users.

A communication system according to a third exemplary embodiment is a system capable of bringing effects comparable to those brought by the processing described in the first and second exemplary embodiments.

Figure 10:
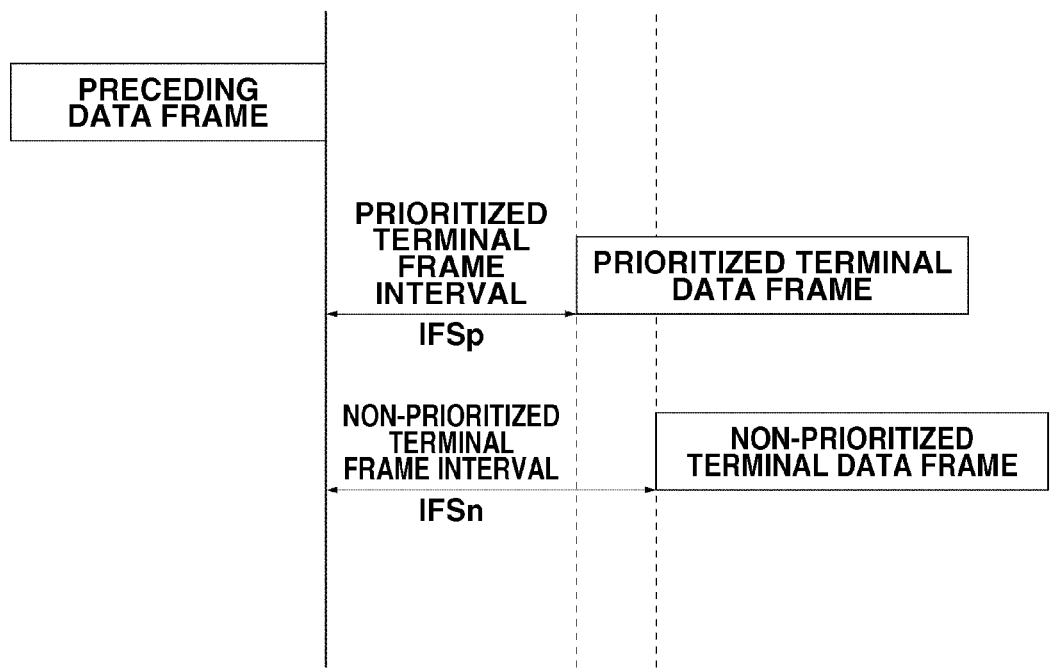
FIG. 10 is a timing diagram illustrating example data transmission via non-contact communication according to an exemplary embodiment of the present invention.

FIG. 10 is a timing diagram illustrating example data transmission via the non-contact communication 102 according to the present exemplary embodiment. The data transmission by the non-contact communication 102 according to the present exemplary embodiment can be performed only one directional at a time.

When the data communication terminal 101 transmits data, the data communication terminal 101 first performs carrier sensing. If an idle state of a communication medium is detected, the data communication terminal 101 waits for a predetermined time corresponding to a frame interval, namely an Inter Frame Space (IFS). Then, if the waiting time has elapsed, the data communication terminal 101 transmits a new data frame.

As illustrated in FIG. 10, in the non-contact communication 102 according to the present exemplary embodiment, a frame interval IFSp, namely a data transmission waiting time for a prioritized terminal, is set to be shorter than a frame interval IFSn for a non-prioritized terminal. Accordingly, if an event for transmitting data occurs simultaneously at the prioritized terminal and the non-prioritized terminal, the prioritized terminal can start the processing for transmitting a data frame earlier than the non-prioritized terminal.

Whether to operate as a prioritized terminal or a non-prioritized terminal is determined at the timing when the link is established (connected). More specifically, one data communication terminal 101 transmits a connection request for the non-contact communication 102. If the other data communication terminal 101 receives the connection request, the other data communication terminal 101 returns a connection response. Thus, the link for the non-contact communication 102 is established (connected) between two data communication terminals 101.

In this case, the data communication terminal 101 that has transmitted the connection request (i.e., received the connection response) is determined as the prioritized terminal. The data communication terminal 101 that has transmitted the connection response (i.e., received the connection request) is determined as the non-prioritized terminal. Namely, in the non-contact communication 102 according to the present exemplary embodiment, transmission of data by the data communication terminal 101 that has transmitted the connection request is prioritized. Further, batch data transmission of a transmission target by the prioritized data communication terminal 101 can be also realized. On the other hand, the data communication terminal 101 that has transmitted the connection response can perform data transmission only when no data is transmitted from the data communication terminal 101 that has transmitted the connection request.

Manipulating the above described characteristics, the prioritized terminal can intentionally start and stop its own data transmission to control data transmission of a non-prioritized terminal. More specifically, when any data to be transmitted is present in the non-prioritized terminal, the prioritized terminal can interrupt its own data transmission processing to enable the non-prioritized terminal to start transmitting the data. Further, the prioritized terminal can resume its own data transmission processing to interrupt the data transmission by the non-prioritized terminal.

Hence, in the present exemplary embodiment, only the data communication terminal 101 serving as the prioritized terminal can perform communication control to realize transmission and reception switching processing similar to those described in the first and second exemplary embodiments.

Processing to be performed by the data communication terminal 101 serving as the prioritized terminal is basically similar to the processing illustrated in FIGS. 3, 4, 7, and 8 described in the first and second exemplary embodiments. However, in the present exemplary embodiment, the prioritized data communication terminal 101 does not transmit the transmission/reception switching (transmission start) message and the transmission/reception switching (transmission stop) message. In other words, the prioritized data communication terminal 101 does not perform the processing of steps S405 and S409.

In the first exemplary embodiment, the transmission/reception switching (transmission start) message includes information designating the number of bytes to be transmitted by the partner's data communication terminal 101 during one transmission period. On the other hand, in the present exemplary embodiment, if transmission of the data corresponding to the number of bytes to be transmitted during one transmission period which was determined in step S310 is completed (YES in step S404), then the prioritized data communication terminal 101 interrupts its own data transmission processing to give a data transmission right to the partner's (i.e., the non-prioritized) data communication terminal 101.

More specifically, the prioritized data communication terminal 101 interrupts its own data transmission processing during a time interval longer than the frame interval IFSn for the non-prioritized terminal, to enable the partner's data communication terminal 101 to perform data transmission. Further, if reception of the data corresponding to the number of bytes to be received during one reception period which was determined in step S310 is completed (YES in step S408), then the prioritized data communication terminal 101 resumes transmitting the data corresponding to the number of bytes to be transmitted to interrupt the data transmission performed by the partner's data communication terminal 101.

In the second exemplary embodiment, the transmission/reception switching (transmission start) message includes information designating a time required for one transmission processing to be performed by the partner's data communication terminal 101. On the other hand, in the present exemplary embodiment, if the data transmission is continuously performed until the transmission timer whose value was determined in step S701 times out (YES in step S804), then the prioritized data communication terminal 101 interrupts its own data transmission processing to give the data transmission right to the partner's (i.e., the non-prioritized) data communication terminal 101.

More specifically, the prioritized data communication terminal 101 interrupts its own data transmission processing during a time interval longer than the frame interval IFSn for the non-prioritized terminal, to enable the partner's data communication terminal 101 to perform data transmission. If the reception timer whose value was set in step S701 times out (YES in step S807), then the prioritized data communication terminal 101 resumes the data transmission processing to interrupt the data transmission by the partner's data communication terminal 101.

As described above, in the present exemplary embodiment, the data communication terminal serving as the prioritized terminal controls its own data transmission and interruption so as to realize divisional transmission and reception processing similar to those described in the first and second exemplary embodiments. Therefore, the data communication terminal serving as the non-prioritized terminal is not required to perform any special control to obtain effects similar to those described in the first and second exemplary embodiments.

Further, in the above described exemplary embodiments, each of the data communication terminals 101A and 101B transmits the file transmission request message to notify the communication partner of transmission of a file. However, another method can be used. For example, the connection request message or the connection response message can include information indicating the presence of a file to be transmitted.

In the above described exemplary embodiments, the file transmission request message includes information indicating the size of a file to be transmitted. However, another method can be used. For example, the connection request message or the connection response message can include information indicating the size of a file to be transmitted. In this case, the time required for completing the data communication processing can be reduced because it is unnecessary to transmit and receive the file transmission request message and the file transmission response message.

As described above, in the above described exemplary embodiments, if there is any data to be transmitted, a host communication apparatus and a communication partner's apparatus can adequately perform data communication processing according to an amount of data to be transmitted from each apparatus.

Aspects of the present invention can also be realized by a computer of a system or apparatus (or devices such as a CPU or MPU) that reads out and executes a program recorded on a memory device to perform the functions of the above described embodiment(s), and by a method, the steps of which are performed by a computer of a system or apparatus by, for example, reading out and executing a program recorded on a memory device to perform the functions of the above described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-149061 filed Jun. 23, 2009, which is hereby incorporated by reference herein in its entirety.

What is claimed is:

1. An apparatus comprising:
a transmission unit configured to divide a first file into a plurality of pieces and separately transmit the plurality of pieces of the first file to a remote apparatus;
a reception unit configured to separately receive a plurality of pieces of a second file from the remote apparatus;
a discrimination unit configured to discriminate a size of the first file and a size of the second file;
a decision unit configured to decide switch timing between transmission of the first file by the transmission unit and reception of the second file by the reception unit based on the size of the first file and the size of the second file discriminated by the discrimination unit, in a case where the plurality of pieces of the first file are to be separately transmitted and the plurality of pieces of the second file are to be separately received; and
a switching unit configured to switch between transmission of the first file and reception of the second file according to the decided switch timing.

2. The apparatus according to claim 1, wherein the switch timing is determined based on a comparison between the size of the first file and the size of the second file.

3. The apparatus according to claim 1, wherein the switch timing is determined so as to equalize a number of data transmissions performed by the apparatus with a number of data transmissions performed by the remote apparatus.

4. The apparatus according to claim 1, wherein information to be determined as the switch timing includes a transmitted amount of data before the switching unit switches from transmission to reception and a received amount of data before the switching unit switches from reception to transmission.

5. The apparatus according to claim 1, wherein information to be determined as the switch timing includes a time required for data transmission before the switching unit switches from transmission to reception and a time required for data reception before the switching unit switches from reception to transmission.

6. The apparatus according to claim 1, wherein the apparatus is an apparatus usable in a system in which a waiting time from when an idle state of a communication medium is detected to when data transmission is started which is set for a prioritized terminal is shorter than the waiting time set for a non-prioritized terminal, further comprising:
a determination unit configured to determine whether to operate as the prioritized terminal or the non-prioritized terminal,
wherein, when the apparatus operates as the prioritized terminal, the switching unit is configured to switch between data transmission and interruption of the data transmission so that the switching between transmission and reception can be performed according to the decided switch timing.

7. The apparatus according to claim 6, wherein the determination unit is configured to determine whether to operate as the prioritized terminal or the non-prioritized terminal, by checking which terminal is transmitted to establish a wireless link between a connection request message and a connection response message.

8. A method for controlling an apparatus, comprising:
dividing a first file to be transmitted from the apparatus into a plurality of pieces;
dividing a second file to be transmitted from a remote apparatus into a plurality of pieces;
discriminating a size of the first file and a size of the second file;
deciding switch timing between transmission of the first file and reception of the second file based on the discriminated size of the first file and the size of the second file, in a case where the plurality of pieces of the first file are to be separately transmitted and the plurality of pieces of the second file are to be separately received; and
switching between transmission of the first file and reception of the second file according to the decided switch timing.

9. A non-transitory computer-readable storage medium storing a computer program that causes a computer to execute a method for controlling an apparatus, the method comprising:
dividing a first file to be transmitted from the apparatus into a plurality of pieces;
dividing a second file to be transmitted from a remote apparatus into a plurality of pieces;
discriminating a size of the first file and a size of the second file;
deciding switch timing between transmission of the first file and reception of the second file based on the discriminated size of the first file and the size of the second file, in a case where the plurality of pieces of the first file are to be separately transmitted and the plurality of pieces of the second file are to be separately received; and
switching between transmission of the first file and reception of the second file according to the decided switch timing.

* * * * *